United States Patent
Snyder (10) Patent No.: US 7,608,122 B2
(45) Date of Patent: Oct. 27, 2009

(54) PARTICLE SEPARATORS FOR GAS TURBINE ENGINES

(75) Inventor: Philip Harold Snyder, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 226 days.

(21) Appl. No.: 11/633,252

(22) Filed: Dec. 4, 2006

(65) Prior Publication Data

US 2007/0186534 A1 Aug. 16, 2007

Related U.S. Application Data

(63) Continuation of application No. PCT/US2006/024054, filed on Jun. 20, 2006.

(60) Provisional application No. 60/692,429, filed on Jun. 20, 2005.

(51) Int. Cl.
*B01D 39/00* (2006.01)

(52) U.S. Cl. ............... 55/306; 55/307; 55/396; 55/397; 55/440; 55/441; 60/39.092

(58) Field of Classification Search ........... 55/306, 55/307, 396, 397, 398, 440, 441; 60/39.092; 96/267; 244/53 B; 415/121.2
See application file for complete search history.

(56) References Cited

U.S. PATENT DOCUMENTS

| | | | |
|---|---|---|---|
| 2,931,460 A | 4/1960 | McEachern et al. | |
| 3,368,332 A | 2/1968 | Hooper et al. | |
| 3,421,296 A | 1/1969 | Beurer, Sr. | |
| 3,449,891 A | 6/1969 | Shohet et al. | |
| 3,465,950 A | 9/1969 | Freid et al. | |
| 3,513,641 A | 5/1970 | Hopper et al. | |
| 3,521,431 A | 7/1970 | Connors et al. | |
| 3,534,548 A | 10/1970 | Connors | |
| 3,616,616 A | 11/1971 | Flatt | |
| 3,673,771 A | 7/1972 | Dickey | |
| 3,766,719 A | 10/1973 | McAnally, III | |
| 3,778,983 A | * 12/1973 | Rygg | ............... 55/306 |
| 3,832,086 A | 8/1974 | Hull, Jr. et al. | |
| 3,970,439 A | 7/1976 | Murphy | |
| 3,978,656 A | 9/1976 | Murphy | |
| 3,993,463 A | 11/1976 | Barr | |
| 4,198,219 A | 4/1980 | Krisko | |
| 4,265,646 A | 5/1981 | Weinstein et al. | |
| 4,268,284 A | 5/1981 | Kent et al. | |
| 4,509,962 A | 4/1985 | Breitman et al. | |
| 4,527,387 A | 7/1985 | Lastrina et al. | |
| 4,591,312 A | 5/1986 | Wenglarz | |
| 4,592,765 A | 6/1986 | Breitman et al. | |

(Continued)

FOREIGN PATENT DOCUMENTS

GB 2270481 3/1994

*Primary Examiner*—Duane Smith
*Assistant Examiner*—Sonji Turner
(74) *Attorney, Agent, or Firm*—Krieg DeVault LLP; Matthew D. Fair, Esq.

(57) ABSTRACT

A particle separator for use in connection with a gas turbine engine is disclosed. The particle separator extends circumferentially less than 360 degrees between a first end and a second end. In one embodiment, an inner scavenge conduit is spaced radially inward from an outer scavenge conduit. An inlet can be located between the outer scavenge conduit and the inner scavenge conduit and adapted to receive airflow. A plurality of separated airflow paths can be located between the inner and outer scavenge conduits. The outer scavenge conduit and the inner scavenge conduit can be adapted to receive particles separated from the inlet airflow as the inlet airflow passes along the curved separating portion.

19 Claims, 7 Drawing Sheets

U.S. PATENT DOCUMENTS

| | | |
|---|---|---|
| 4,617,028 A | 10/1986 | Ray et al. |
| 4,685,942 A | 8/1987 | Klassen et al. |
| 4,702,071 A | 10/1987 | Jenkins et al. |
| 4,704,145 A | 11/1987 | Norris et al. |
| 4,928,480 A | 5/1990 | Oliver et al. |
| 5,039,317 A | 8/1991 | Thompson et al. |
| 5,139,545 A | 8/1992 | Mann |
| 5,222,693 A | 6/1993 | Slutzkin et al. |
| 5,268,011 A | 12/1993 | Wurz |
| 5,320,651 A | 6/1994 | Drummond |
| 5,746,789 A | 5/1998 | Wright et al. |
| 5,827,043 A | 10/1998 | Fukuda et al. |
| 6,129,509 A | 10/2000 | Cousin et al. |
| 6,134,874 A | 10/2000 | Stoten |
| 6,499,285 B1 | 12/2002 | Snyder |
| 6,508,052 B1 | 1/2003 | Snyder et al. |
| 6,698,180 B2 | 3/2004 | Snyder |
| 7,374,593 B2 | 5/2008 | Snyder |
| 2005/0166571 A1 | 8/2005 | Marinella Pavlatos |

\* cited by examiner

Fig. 7

PARTICLE SEPARATORS FOR GAS TURBINE ENGINES

CROSS-REFERENCE

The present application is a continuation of PCT Patent Application No. PCT/US2006/024054 filed Jun. 20, 2006, which claims the benefit of U.S. Provisional Patent Application No. 60/692,429 filed Jun. 20, 2005, each of which is incorporated herein by reference.

BACKGROUND

The present invention relates generally to particle separators and more particularly, but not exclusively, to inertial particle separators for application with gas turbine engines.

Particle separators are operable to separate undesirable materials from air entering a gas turbine engine. Such undesirable materials may adversely affect the internal working components of the gas turbine engine if they were allowed to enter the engine. Presently, many particle separator designs have a variety of shortcomings, drawbacks and disadvantages. Accordingly, there is a need for the unique and inventive particle separators according to the present invention.

SUMMARY

One embodiment according to the present invention is a unique particle separator for a gas turbine engine. Other embodiments include unique apparatuses, systems, devices, hardware, methods, and combinations of these for particle separation in gas turbine engines. Further embodiments, forms, objects, features, advantages, aspects, and benefits of the present invention shall become apparent from the following description and drawings.

DETAILED DESCRIPTION OF ILLUSTRATIVE EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

Figure 1:
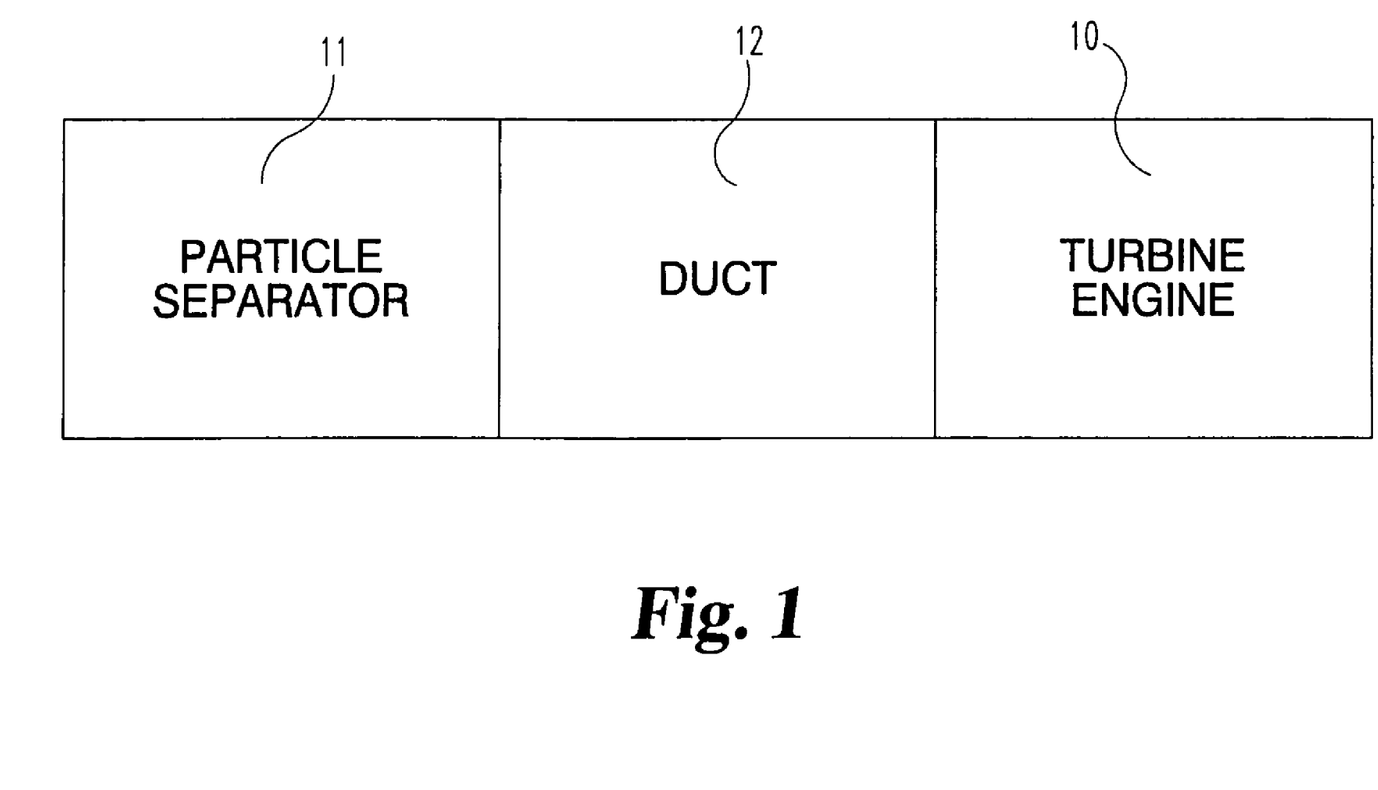
FIG. 1 is a block diagram depicting a particle separator operatively coupled with a gas turbine engine.

Referring to FIG. 1, there is illustrated a block diagram of a gas turbine engine 10 having a particle separator 11 coupled thereto. The particle separator 11 may be coupled to the gas turbine engine 10 by a fluid flow duct 12. Particle separator 11 can also be differently coupled with engine 10 such as, for example, directly coupled, coupled with other intermediate passageways, flowpaths, elements, and/or structure, or could be coupled in a variety of other manners as would occur to one of skill in the art.

Particle separator 11 is arranged to separate matter, such as, but not limited to sand, dust, dirt, liquids, and/or any particulate matter, all of which are referred to as particles, from the air that passes through the particle separator 11 to an inlet of the gas turbine engine 10. In one form the particle separator 11 is incorporated into an aircraft. The term aircraft includes, but is not limited to, helicopters, airplanes, unmanned space vehicles, fixed wing vehicles, variable wing vehicles and others devices generally known to one of ordinary skill in the art. Further, the present inventions are contemplated for utilization in other applications that may not be coupled with an aircraft such as, for example, industrial applications, power generation, pumping sets, naval propulsion, hover crafts, vehicles and other applications known to one of ordinary skill in the art.

Figure 2:
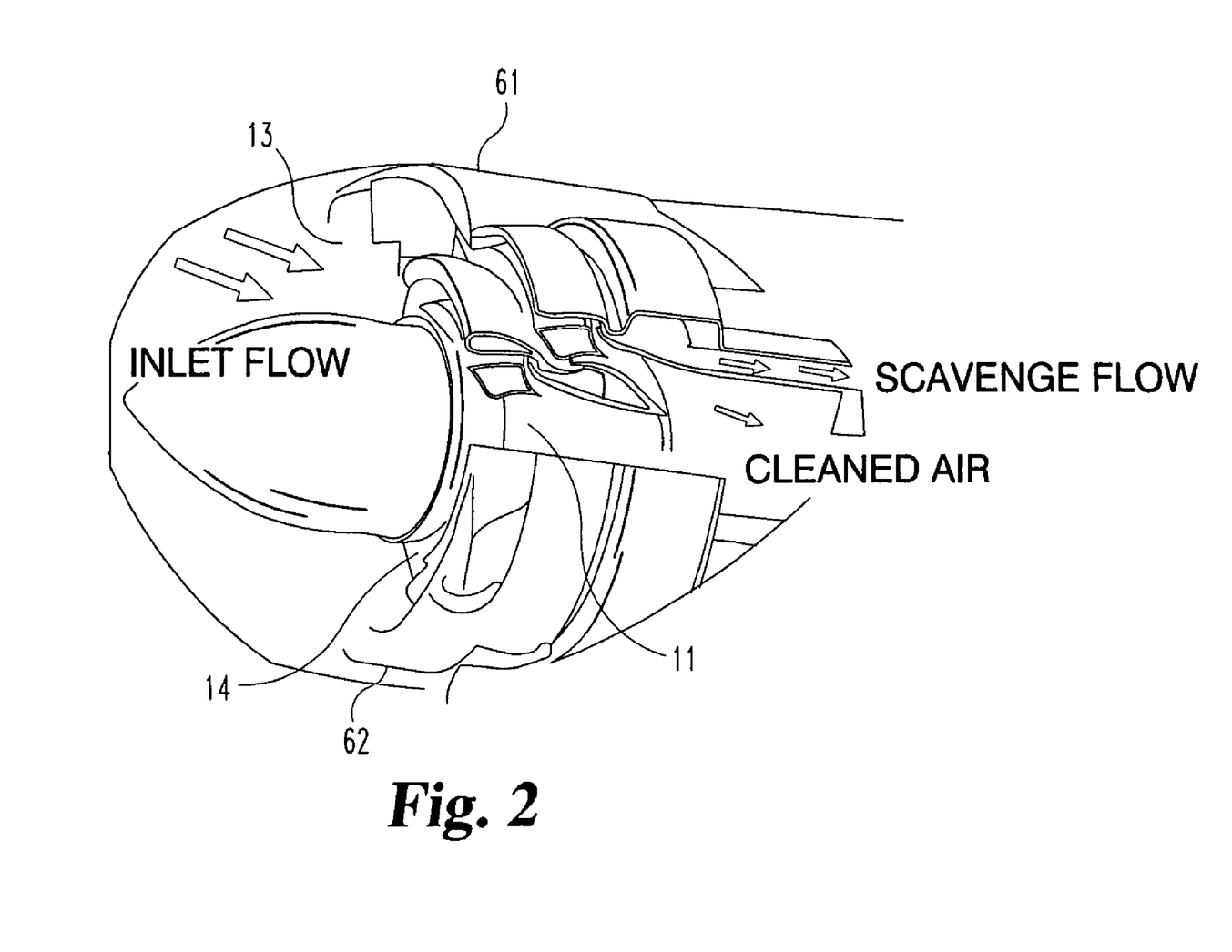
FIG. 2 is a perspective partial-cutaway view of a particle separator.

Referring to FIG. 2, there is illustrated particle separator 11 configured for use in connection with an aircraft. Particle separator 11 is one example of a partially circumferential particle separator which extends through a span of about 180 degrees between ends 61 and 62. The particle separator 11 may have a variety of configurations and forms including pie slice shapes, pie portion shapes, smile shapes, partial smile shapes, partial annular shapes, partial ring shapes and others as would occur to those of skill in the art. Let it be understood that the foregoing and other shapes includes shapes spanning less than 360 degrees and that other particle separators having any other circumferential span less than 360 degrees are contemplated within the scope of the invention including, but not limited to, about 30 degrees, about 45 degrees, about 90 degrees, about 270 degrees, to name but a few examples.

Particle separator 11 includes an air inlet 14. The flow of air and potentially undesirable particles and/or materials enters the particle separator 11 through the air inlet 14. The inflow of air entering the inlet 14 may include other material and contaminants such as but not limited to sand, dirt, dust, liquids, foreign objects and any other particular matter. As the inlet flow of air passes through the particle separator 11, undesirable particles and/or materials are removed from the air prior to discharge from the particle separator 11. It should be understood herein that the removal of undesirable particles and/or materials may be total or partial. The flow of air containing the undesirable particles, referred to as scavenge flow, is directed out of the particle separator 11 before entering the gas turbine engine 10. The term scavenged and/or scavenged air will be utilized herein to also refer to the separated material and/or particles and the air including the separated material and/or particles. The cleaned air from the particle separator 11 flows into the inlet of the gas turbine engine 10. The reader will understand that clean and/or cleaned air is a relative term and the air being passed to the inlet of the gas turbine engine may contain some contaminants and/or particulate matter.

The particle separator 11 has a partial annular flow path extending less than 360°, however, the inlet to the gas turbine engine may comprise a 360° annular opening. However, other inlet configurations for the gas turbine engine 10 are also contemplated as would occur to a person of skill in the art.

Figure 3:
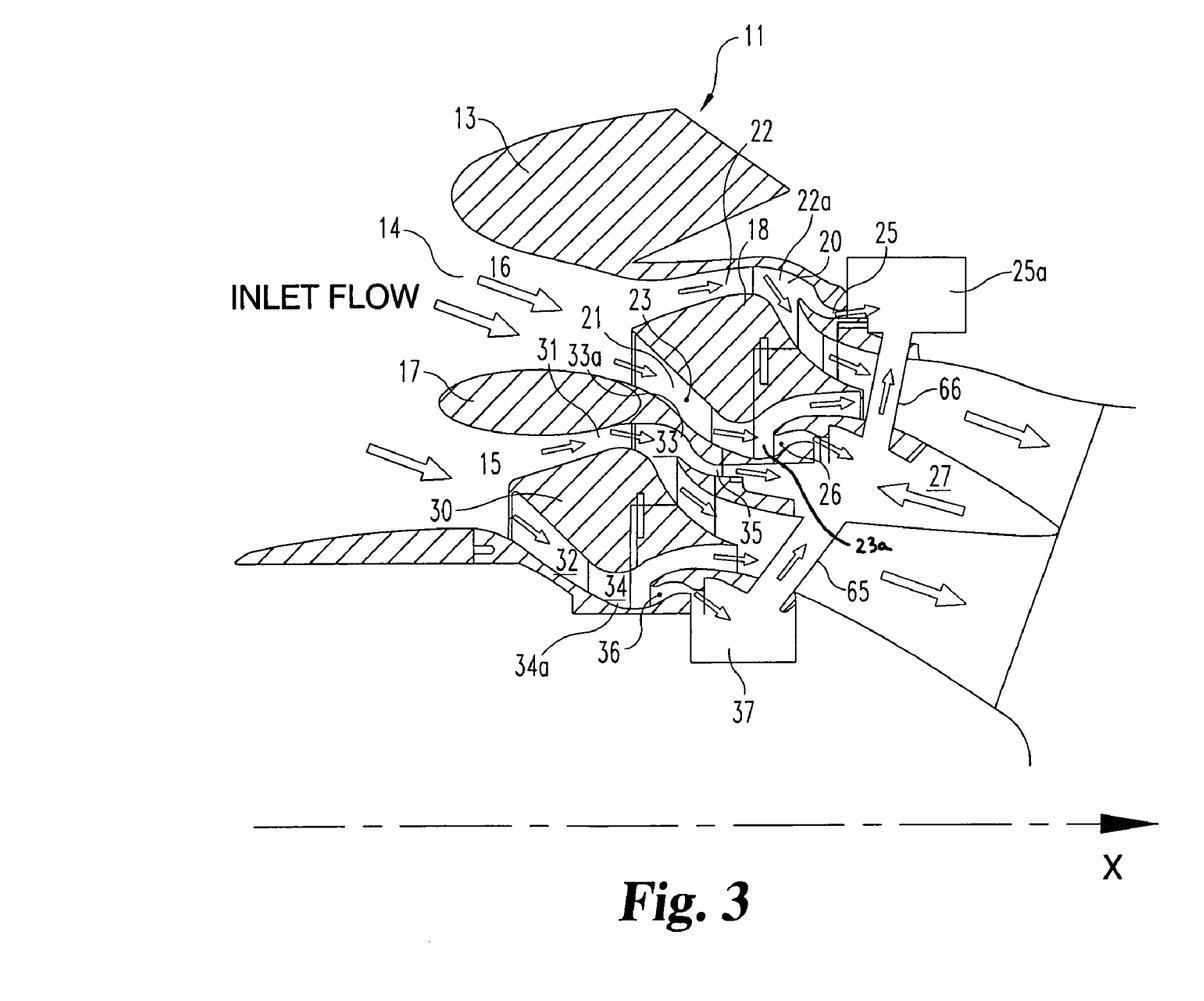
FIG. 3 is a cross-sectional view of a portion of the particle separator of FIG. 2.

Referring to FIG. 3, a cross-sectional view of a portion of particle separator 11 is illustrated. The particle separator 11 may be partially symmetric about the centerline X, which could be the centerline of an associated gas turbine engine, or could be offset therefrom in a variety of other configurations. The flow of air into the particle separator 11 through inlet 14 may be divided into a radially inner airflow 15 and a radially outer airflow 16 by a flow divider 17. As the flow of air continues through the particle separator 11, the radially outer airflow 16 passes over a first flow divider 18 where it may be divided into an upper outer airflow stream 20 and an upper inner airflow stream 21. The upper outer and upper inner airflow streams 20 and 21 pass through respective passageways 22 and 23 that conduct the airflow streams through curved branch portions 22a and 23a of passageways 22 and 23. Curved branch portions 22a and 23a of passageways 22 and 23 facilitate the separation of the unwanted particles from the airflow streams.

The inertia of the particles in the upper outer airflow stream 20 causes the particles to flow through opening 25 and into an outer scavenge duct/conduit 25a. The outer scavenge duct/conduit 25a extends around the particle separator 11 and is adapted for receiving particles and/or materials from the air flow within the particle separator. The inertia of the particles in the upper inner airflow stream 21 causes the particles to flow through an opening 26 into a intermediate scavenge duct/conduit 27. The intermediate scavenge duct/conduit 27 extends around the particle separator 11 and is adapted for receiving particles and/or materials from the air flow within the particle separator.

As the flow of air continues through the particle separator 11, the inner airflow 15 passes over a second flow divider 30 where it may be divided into a lower outer airflow stream 31 and a lower inner airflow stream 32. The lower outer and lower inner airflow streams 31 and 32 pass through respective passageways 33 and 34 that conduct the flows through curved branch portions 33a and 34a. The curved branch portions 33a and 34a of the passageways 33 and 34 facilitate the separation of the particles from the respective airflow streams 31 and 32. The inertia of the particles in the lower outer airflow stream 31 causes the particles to flow through an opening 35 into the inner scavenge duct/conduit 27. The inertia of the particles in the inner airflow stream 32 causes the particles to flow through an opening 36 into an inner scavenge duct/conduit 37.

In one form of the present invention the flow divider 17 may function to deflect coarser particles in the inlet 14 into the passageways 22, 23, 33 and 34 such that they arrive at the openings 25, 26, 35 and 36 leads to the ducts/conduits 25a, 27 and 37.

In one embodiment a hollow strut or conduit (not illustrated in embodiment of FIG. 3) including a fluid flow path may be coupled between intermediate duct/conduits 27 and inner duct/conduit 37 to allow the passage of the scavenge flow from inner conduit 37 to inner conduit 27. A single or plurality of hollow struts or conduits may be utilized. In this embodiment another hollow strut including a fluid flow path may be coupled between the intermediate duct/conduit 27 and outer conduit 25a to allow the passage of the scavenge flow from intermediate duct/conduit 27 to outer duct/conduit 25a. This alternative embodiment utilizes hollow struts that cross fluid flow passageways within the particle separator.

Figure 4:
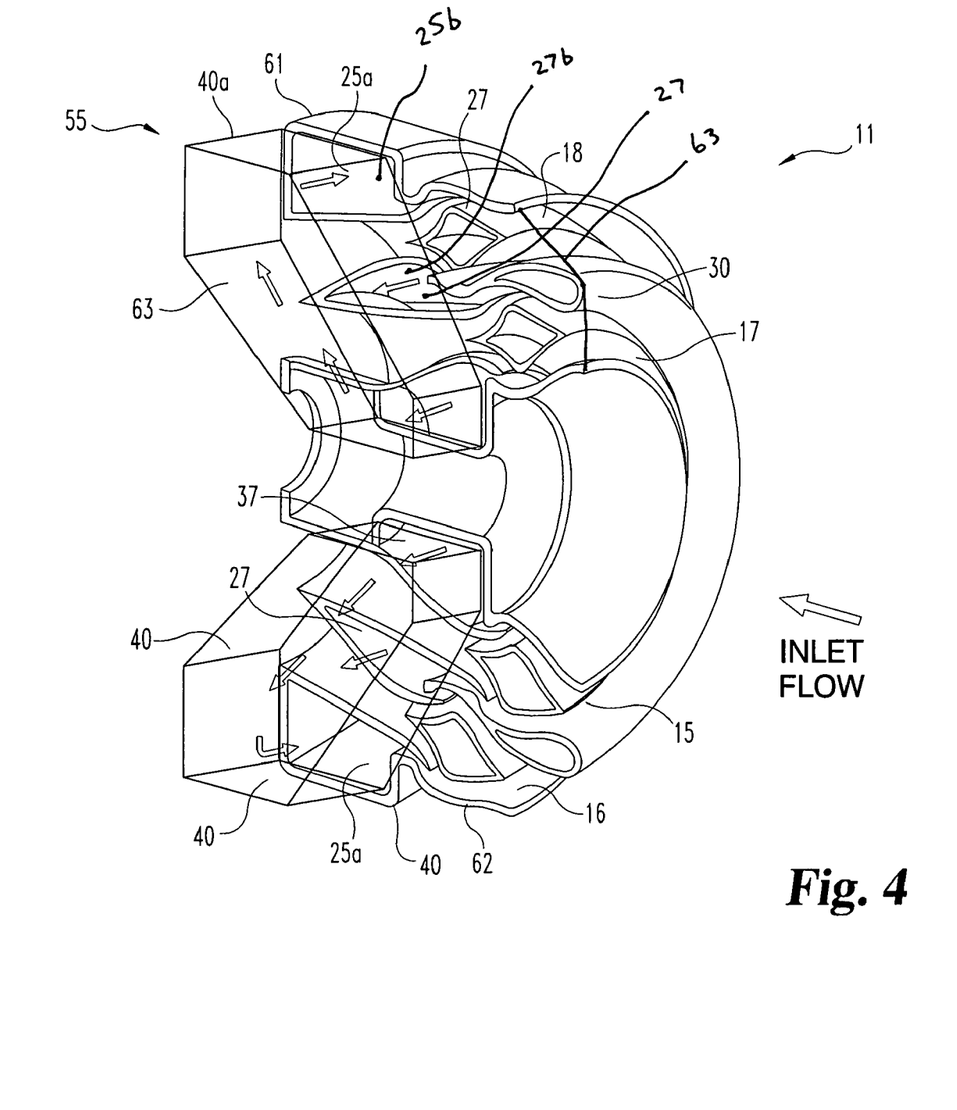
FIG. 4 is a perspective partial-cutaway view of a particle separator.

In one form the scavenge flow in ducts/conduits 25a, 27 and 37 is disposed in fluid flow with an exit duct (not illustrated). As illustrated in FIG. 7, an exit duct 40 may be coupled with the outer duct/conduit 25a at approximately the middle of the particle separator 11. In another form, struts may traverse in a more circumferential direction and may also be used to provide structural positioning and/or support of toroids or other structure(s) located adjacent or next to the struts. One strut may be used to provide fluid communication between the respective ducts/conduits 25a, 27 and 37 instead of two struts. Embodiments with three or more struts are also contemplated Referring to FIG. 4, there is set forth a perspective view of one embodiment of the particle separator 11. FIG. 4 shows one form of terminating the flow paths containing the separated particles within the particle separator 11. The embodiment of FIG. 4, utilizes a flat radial wall 63 for terminating the flow paths at the ends 61 and 62 of the particle separator 11. The flat radial wall 63 includes a plurality of apertures 25b, 27b and 37b configured to allow fluid flow between the respective outer scavenge duct/conduit 25a, the intermediate scavenge duct/conduit 27, the inner scavenge duct/conduit 37 and the exit duct 40. The present invention is not limited herein to terminating the flow paths at the ends 61 and 62 of the particle separator with a plate. In a portion of the text below and with reference to FIGS. 5 and 6 there is set forth alternative forms of terminating the flow paths at the ends of the particle separator 11. In one form flat radial wall 63 and exit duct 40 also function as mechanical support members for the, but not limited to, scavenge ducts, flow dividers.

The flow of particles and/or air within the outer, intermediate and inner scavenge ducts/conduits 25a, 27, and 37 is referred to herein as scavenge flow. FIG. 4 provides one system for routing the scavenge flow through the scavenge ducts/conduits 27 and 37 and out of the particle separator 11 through the exit duct 40 and back into the scavenge duct/conduit 25a. The scavenge flow within the scavenge duct/conduit 25a moves circumferentially to an exit duct and/or opening to be expelled from the scavenge duct/conduit 25a. The scavenge flow in the scavenge ducts/conduits 27 and 37 move circumferentially to either the first or second ends 61 and 62 of the particle separator 11. At the first and second ends 61 and 62 of the particle separator 11, the scavenge flow exits the scavenge ducts/conduits 27 and 37 and passes into respective exit ducts 40 and to the scavenge duct/conduit 25a. The exit duct 40 has an inner wall surface 40a defined by plate 63 and the remaining interior surfaces defined by the exit duct body to define the fluid pathway therethrough that the scavenge flow from scavenge ducts/conduits 27 and 37 flow. As discussed above a discharge opening and/or discharge duct system may be coupled to the scavenge duct/conduit 25a to allow the scavenged air to be discharged away from the particle separator 11.

The external duct 40 allows for fluid communication to occur between the respective scavenge ducts/conduits 25a, 27, and 37 without crossing any fluid flow pathways within the particle separator. During operation of the particle separator, the scavenge flow received at the first end 61 of the particle separator 11 that has flowed out of the scavenge ducts/conduits 27 and 37 and into the external duct 40 where the scavenge flow is directed to the outer scavenge conduit 25a. In addition, the scavenge flow at the second end 62 of the particle separator 11 flows out of scavenge ducts/conduits 27 and 37 and into external duct 40 where the scavenge flow is then directed to the outer scavenge conduit 25a. As such, scavenge flow flows from the inner scavenge conduits 27 and 37 to the outer scavenge conduit 25a.

Referring collectively to FIGS. 4 and 7, an exit duct 41 may be coupled in fluid flow communication with the outer scavenge duct/conduit 25a. In one form the exit duct 41 is coupled at approximately the middle of the outer scavenge duct/conduit 25a or between the first and second ends 61 and 62.

However, other connections locations for the exit duct 41 are contemplated herein. The exit duct 41 functions as a passageway to discharge the scavenged flow from the particle separator 11. As set forth above, the scavenge flow in the inner scavenge conduits 27 and 37 are directed to the outer scavenge conduit 25a, which may have an exit duct 41 connected with it at approximately the middle portion of the outer conduit 25a. The scavenge flow flows from inner scavenge conduits 27 and 37 to the outer scavenge conduit 25a, via external duct 40 and then is discharged from the particle separator 11 by flowing through the outer scavenge conduit 25a to the exit duct 41 and then out of the particle separator 11.

The exit duct 41 may be connected with a suction source 42, such as a blower or an ejector, to advance the scavenge flow out of the particle separator 11. In this form, wherein the ends 61 and 62 of the particle separator 11 are terminated by the flat radial wall 63 of the external ducts 40 and 40a, the inner scavenge conduits 27 and 37 are accessible to the external duct 40 without having to cross airflow paths.

Figure 5:
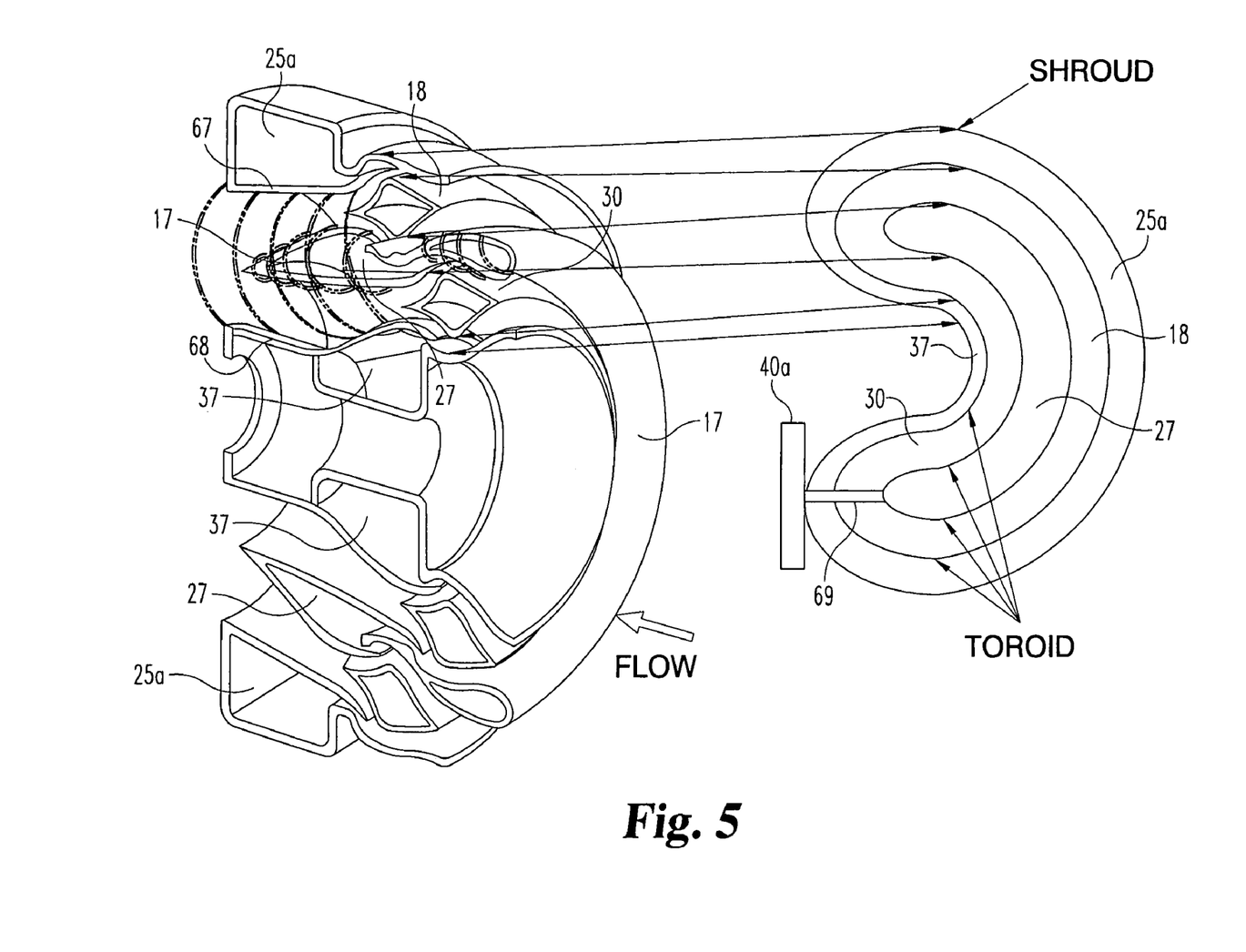
FIG. 5 is a perspective partial-cutaway view of a particle separator.

Referring to FIG. 5, there is illustrated an alternative embodiment of terminating the scavenge flow paths within the particle separator 11 at the ends 61 and 62 of the particle separator. The particle separator 11 described with reference to FIG. 5 blends or connects and completes the internal passageways 22, 23, 33, 34 at the ends 61 and 62 of the particle separator 11 by joining a lower end wall 67 of the outer scavenge duct/conduit 25a with an upper end wall 68 of the inner scavenge duct/conduit 37. Although not specifically illustrated in FIG. 5, the remaining end portion of the outer scavenge conduit 25a and the inner conduit scavenge 37 may be connected with an external duct 90.

Inner scavenge duct/conduit 27 may be terminated back on itself at their ends and is not be able to be disposed in flow communication with the external ducts 90 or scavenge ducts/conduits 25a and 37 without crossing an airflow path. The flow dividers 18 and 30 may be blended together on the ends 61 and 62 in a similar manner as the outer scavenger shroud 25a and inner scavenger shroud 37 as illustrated in FIG. 5. One or more hollow struts 69 may be used to route the scavenge flow from the inner scavenge duct/conduit 27 across a flow path to the respective external ducts 90 or scavenge ducts/conduits 25a and 37. As illustrated in FIG. 5, the hollow strut 69 traverses in a generally circumferential direction and may also be used to provide structural positioning or support for any adjacent toroidal and/or other structure(s).

Figure 6:
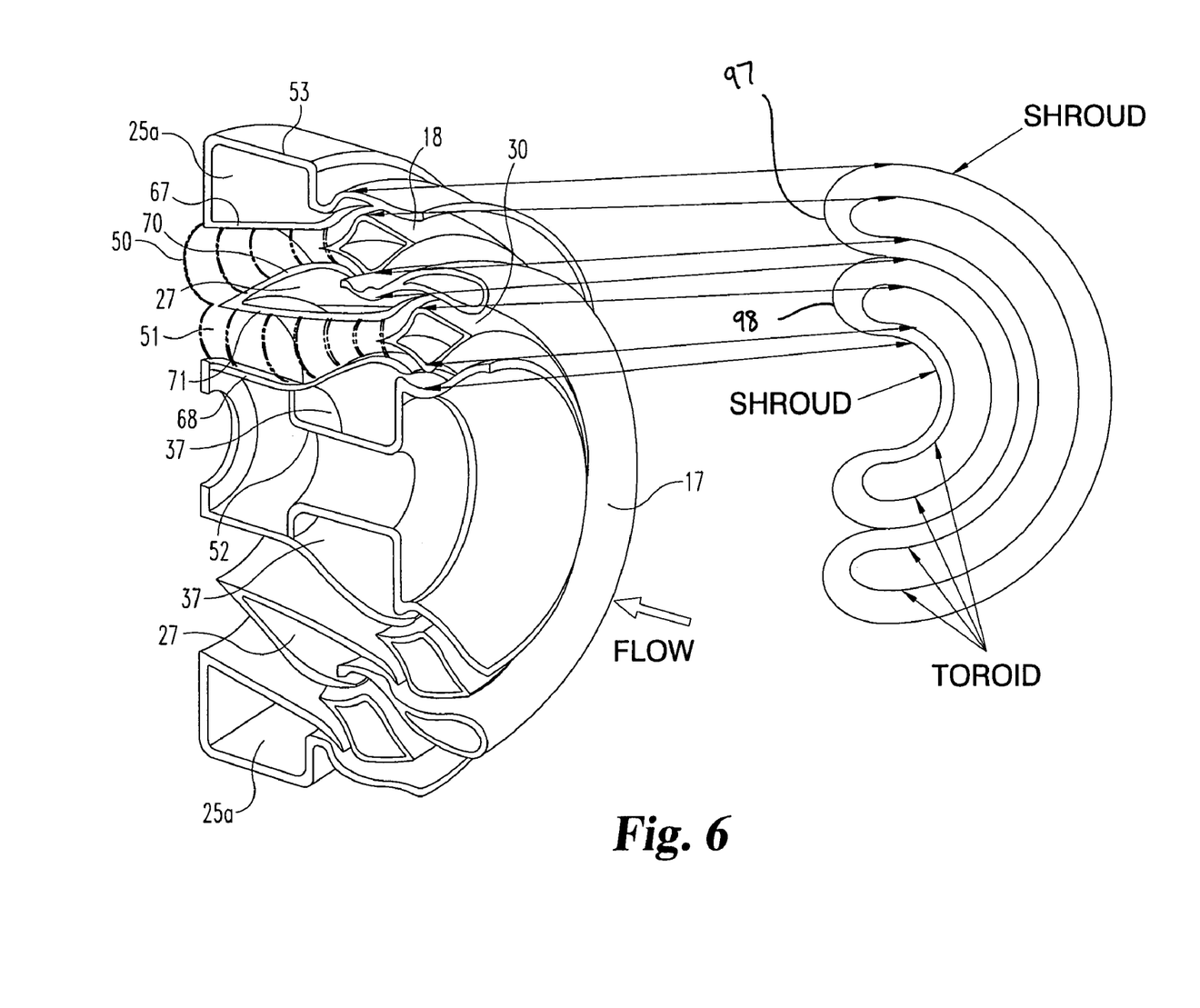
FIG. 6 is a perspective partial-cutaway view of a particle separator.
Figure 7:
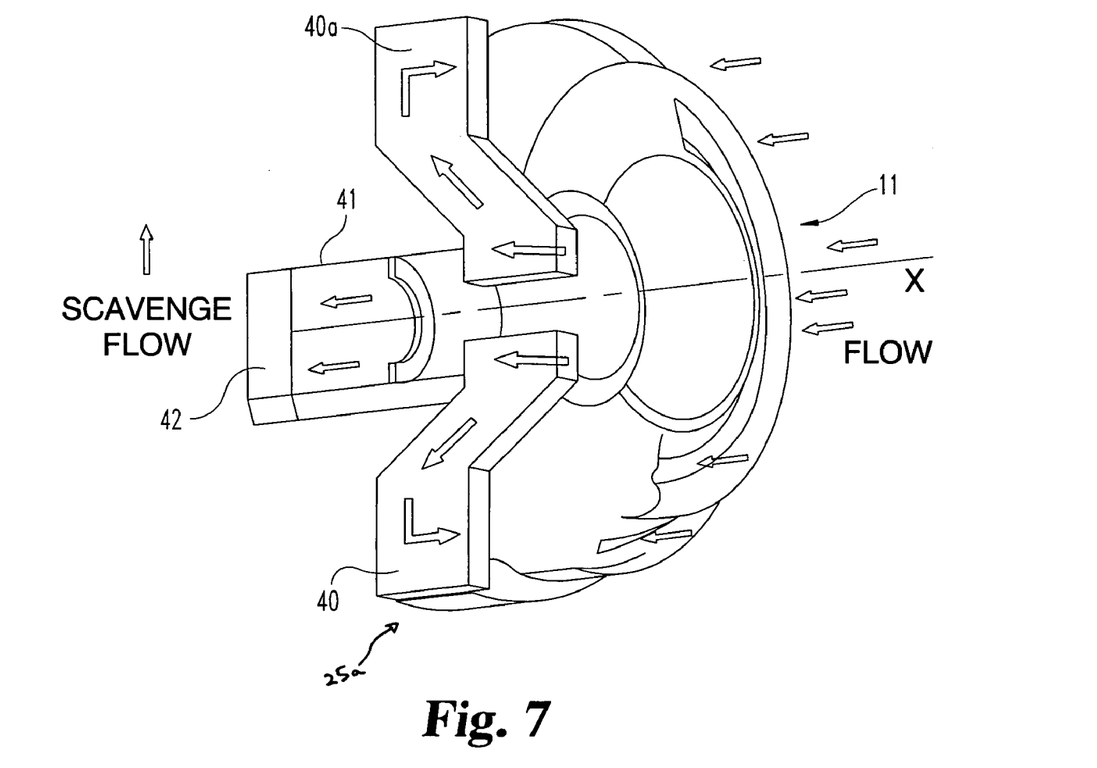
FIG. 7 is a perspective partial-cutaway view of a particle separator including external ducts and a scavenge flow exit duct.

Referring to FIG. 6, there is illustrated another alternative for terminating the scavenged flow paths within the particle separator 11 at the ends 61 and 62 of the particle separator 11. The particle separator 11 defined with reference to FIG. 6 terminates the ends 61 and 62 of the particle separator 11 by blending a lower end portion 67 of the outer scavenge duct/conduit 25a with an upper end portion 70 of the intermediate scavenge duct/conduit 27. A lower end portion 71 of the intermediate scavenge duct/conduit 27 may be blended or connected with an upper end portion 68 of the inner scavenge duct/conduit 37. An outer duct (not illustrated completes the fluid flow passageway between the scavenge conduits/ducts 27, 37 and the outer scavenge conduit/duct 25a.

In another embodiment, the divider member 17 and flow dividers 18, 30 may be terminated by blending the outer surface of each member 17 or flow dividers 18 and 30 with the inner surface of the same structure, which is illustrated in FIG. 6. The divider member 17 and flow dividers 18 and 30 may also be terminated in a manner similar to that illustrated in FIG. 5 or in other forms since an airflow does not pass through these elements.

The result is to create a fluid flow path at the ends 61 and 62 of the particle separator 11 for the passage of the scavenged flow out of the particle separator 11 without having to cross an airflow path. At the ends 61 and 62 of the particle separator the outer scavenge duct/conduit 25a and the intermediate scavenge duct/conduit 27 and the inner scavenge duct/conduit 37 are readily exposed and may be directly connected with a respective external duct/wall structure without having to cross an airflow. In one form, the scavenged flow passes from scavenge ducts/conduits 27 and 37 into scavenge duct/conduit 25a through passageways 97 and 98 where it is moved out through the exit duct passing from the scavenge duct/conduit 25a.

One form of the present invention contemplates an apparatus, comprising: a gas turbine engine including a engine inlet; an inertial particle separator extending circumferentially over less than 360 degrees and terminating at a first end and a second end; and, means for terminating a plurality of scavenge flow passageways within said inertial particle separator at said ends. Another form of the apparatus further includes that the particle separator extends about 180 degrees between said first and second ends. Another form of the apparatus further includes that said plurality of scavenge flow passageways includes an intermediate scavenge duct, an outer scavenge duct and an inner scavenge duct for receiving material separated from an inlet air flow by said particle separator. Another form of the apparatus includes that said inner scavenge duct and said intermediate scavenge duct deliver scavenged air flow to an external duct coupled with said outer scavenge duct. Another form of the apparatus includes that that said plurality of scavenge flow passageways includes an intermediate scavenge duct, an outer scavenge duct and an inner scavenge duct for receiving material separated from an inlet air flow by said particle separator. Another form of the apparatus includes that said inner scavenge duct and said intermediate scavenge duct deliver scavenged air flow to an external duct coupled with said outer scavenge duct and that said means for terminating includes a plate extending across a portion of the particle separator. Another form of the apparatus further includes that said plurality of scavenge flow passageways includes an intermediate scavenge duct, an outer scavenge duct and an inner scavenge duct for receiving material separated from an inlet air flow by said particle separator and wherein in said means for terminating a lower end portion of said outer scavenge duct is connected with an upper end portion of said inner scavenge duct. Another form of the apparatus further includes that said plurality of scavenge flow passageways includes an intermediate scavenge duct, an outer scavenge duct and an inner scavenge duct for receiving material separated from an inlet air flow by said particle separator and wherein in said means for terminating an upper end portion of said inner scavenge duct conduit is connected with a lower end portion of said intermediate scavenge duct and a lower end portion of said outer scavenge duct is connected with an upper end portion of said intermediate scavenge duct. Another form of the apparatus further includes that said plurality of scavenge flow passageways includes an intermediate scavenge duct, an outer scavenge duct and an inner scavenge duct for receiving material separated from an inlet air flow by said particle separator and wherein said means for terminating including an external duct connected with said inertial particle separator at said first end, wherein a first scavenge flow from said inner scavenge duct flows through said external duct to said outer scavenge duct. Another form of the apparatus further includes that said plurality of scavenge flow passageways includes an intermediate scavenge duct, an outer scavenge duct and an inner scavenge duct for receiving material separated from an inlet air flow by said particle separator and wherein said means for terminating including an external duct connected with said inertial particle separator at said first end, wherein a first scavenge flow from said inner scavenge duct flows through said external duct to said outer scavenge duct and said means for terminating including comprising a second external duct connected with said inertial particle separator at said second end, wherein a second scavenge flow from said inner scavenge duct flows through said external duct to said outer scavenge duct. Another form of the apparatus further includes another form of the apparatus further includes that said plurality of scavenge flow passageways includes an intermediate scavenge duct, an outer scavenge duct and an inner scavenge duct for receiving material separated from an inlet air flow by said particle separator and wherein said means for terminating including an external duct connected with said inertial particle separator at said first end, wherein a first scavenge flow from said inner scavenge duct flows through said external duct to said outer scavenge duct and said means for terminating including comprising a second external duct connected with said inertial particle separator at said second end, wherein a second scavenge flow from said inner scavenge duct flows through said external duct to said outer scavenge duct further comprising an exit connected with said outer scavenge duct between said first and second ends, wherein said first and second scavenge flows flow within said outer scavenge duct to said exit.

One form of the present invention contemplates a particle separator, comprising: an outer scavenge passage extending circumferentially less than 360 degrees between a first end and a second end; an inner scavenge passage extending circumferentially less than 360 degrees between said first and second ends, said inner scavenge passage disposed radially inward from said outer scavenge passage; an air inlet section extending circumferentially less than 360 degrees and located between said outer scavenge passage and said inner scavenge passage and adapted for receiving an inlet airflow, a plurality of separated airflow paths located between said inner scavenge passage and said outer scavenge passage, each of said airflow paths including a curved separating portion; and wherein said outer scavenge passage and said inner scavenge conduit are adapted to receive particles separated from said inlet airflow as the inlet airflow passes along said curved separating portions. Another form of the particle separator further includes that said outer scavenge passage extends about 180 degrees; wherein said inner scavenge passage extends about 180 degrees; and wherein said inlet extends about 180 degrees. Another form of the particle separator further includes that said outer scavenge passage, said inner scavenge passage and said inlet all sweep through substantially the same angle. Another form of the particle separator further includes that said outer scavenge passage and said inner scavenge passage terminate in external ducts located at said first and second ends. In yet another form of the particle separator there is included an intermediate scavenge passage positioned radially between said outer scavenge duct and said inner scavenge duct.

One embodiment of the present invention contemplates a method of separating particles from a flow of air within a particle separator for uses in a gas turbine engine, comprising: separating the flow of air into a plurality of substantially radially spaced airflows; flowing the plurality of radially spaced airflows along a plurality of flow dividers; separating form each of the plurality of airflows particulates contained therein by inertial separation to define a plurality of scavenged air flows; and delivering the plurality of scavenged air flows into at least one scavenge conduit.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
   an inertial particle separator extending circumferentially over less than 360 degrees and terminating at a first end and a second end; and
   means for terminating a plurality of scavenge flow passageways within said inertial particle separator at said ends.

2. The apparatus of claim 1, wherein the particle separator extends about 180 degrees between said first and second ends.

3. The apparatus of claim 1, wherein said plurality of scavenge flow passageways includes an intermediate scavenge duct, an outer scavenge duct and an inner scavenge duct for receiving material separated from an inlet air flow by said particle separator.

4. The apparatus of claim 3, wherein said inner scavenge duct and said intermediate scavenge duct deliver scavenged air flow to an external duct coupled with said outer scavenge duct.

5. The apparatus of claim 4, wherein said means for terminating includes a plate extending across a portion of the particle separator.

6. The apparatus of claim 3, wherein in said means for terminating a lower end portion of said outer scavenge duct is connected with an upper end portion of said inner scavenge duct.

7. The apparatus of claim 3, wherein in said means for terminating an upper end portion of said inner scavenge duct conduit is connected with a lower end portion of said intermediate scavenge duct and a lower end portion of said outer scavenge duct is connected with an upper end portion of said intermediate scavenge duct.

8. The apparatus of claim 3, wherein said means for terminating including an external duct connected with said inertial particle separator at said first end, wherein a first scavenge flow from said inner scavenge duct flows through said external duct to said outer scavenge duct.

9. The apparatus of claim 8, wherein said means for terminating including comprising a second external duct connected with said inertial particle separator at said second end, wherein a second scavenge flow from said inner scavenge duct flows through said second external duct to said outer scavenge duct.

10. The apparatus of claim 9, further comprising an exit connected with said outer scavenge duct between said first and second ends, wherein said first and second scavenge flows flow within said outer scavenge duct to said exit.

11. The apparatus of claim 8, wherein a scavenge flow from said intermediate scavenge duct flows through said external duct to said outer scavenge duct.

12. A particle separator, comprising:
   an outer scavenge passage extending circumferentially less than 360 degrees between a first end and a second end;
   an inner scavenge passage extending circumferentially less than 360 degrees between said first and second ends, said inner scavenge passage disposed radially inward from said outer scavenge passage;
   an air inlet section extending circumferentially less than 360 degrees and located between said outer scavenge passage and said inner scavenge passage and adapted for receiving an inlet airflow,
   a plurality of separated airflow paths located between said inner scavenge passage and said outer scavenge passage, each of said airflow paths including a curved separating portion; and
   wherein said outer scavenge passage and said inner scavenge conduit are adapted to receive particles separated from said inlet airflow as the inlet airflow passes along said curved separating portions.

13. The particle separator of claim 12, wherein said outer scavenge passage extends about 180 degrees;
   wherein said inner scavenge passage extends about 180 degrees; and
   wherein said air inlet section extends about 180 degrees.

14. The particle separator of claim 12, wherein said outer scavenge passage, said inner scavenge passage and said air inlet section all sweep through substantially the same angle.

15. The particle separator of claim 12, wherein said outer scavenge passage and said inner scavenge passage terminate in external ducts located at said first and second ends.

16. The particle separator of claim 12, further comprising an intermediate scavenge passage positioned radially between said outer scavenge passage and said inner scavenge passage.

17. The particle separator of claim 16, wherein a lower end portion of said outer scavenge passage is connected with an upper end portion of said inner scavenge passage.

18. The particle separator of claim 17, further comprising a hollow strut connecting in fluid flow communication said intermediate scavenge passage with said outer scavenge passage.

19. The particle separator of claim 16, wherein a lower end portion of said outer scavenge passage is connected with an upper end portion of said intermediate scavenge passage and a lower end portion of said intermediate scavenge passage is connected with an upper end portion of said inner scavenge passage.

* * * * *